United States Patent [19]

Young et al.

[11] Patent Number: 4,584,660

[45] Date of Patent: Apr. 22, 1986

[54] REDUCTION OF SERIES PROPAGATION DELAY AND IMPEDANCE

[75] Inventors: William R. Young; Michael C. Hoke, both of Palm Bay, Fla.

[73] Assignee: Harris Corporation, Melbourne, Fla.

[21] Appl. No.: 506,793

[22] Filed: Jun. 22, 1983

[51] Int. Cl.⁴ .............................................. G06F 7/50
[52] U.S. Cl. .................... 364/786; 364/787; 364/770; 377/116
[58] Field of Search ....................... 364/786, 787, 770; 377/115, 116, 117

[56] References Cited

U.S. PATENT DOCUMENTS

| | | | |
|---|---|---|---|
| 3,843,876 | 10/1974 | Fette et al. | 364/786 |
| 4,052,604 | 10/1977 | Maitland et al. | 364/786 |
| 4,054,788 | 10/1977 | Maitland et al. | 364/786 |
| 4,152,775 | 5/1979 | Schwartz | 364/786 |
| 4,153,939 | 5/1979 | Kudou | 364/770 |
| 4,214,173 | 7/1980 | Popper | 377/117 |
| 4,425,623 | 1/1984 | Russell | 364/786 |
| 4,433,372 | 2/1984 | Eichrodt et al. | 377/116 |
| 4,464,774 | 8/1984 | Jennings | 377/117 |

*Primary Examiner*—David H. Malzahn
*Attorney, Agent, or Firm*—Barnes & Thornburg

[57] ABSTRACT

A serial fast propagation transmission switch responsive to a propagate input control signal to transmit a signal from the input to the output terminal in combination with a double inverting logic parallel to the transmission switch to limit the line impedance to a single stage impedance subsequent to the serial transmission.

15 Claims, 5 Drawing Figures

REDUCTION OF SERIES PROPAGATION DELAY AND IMPEDANCE

BACKGROUND OF THE INVENTION

Present invention relates generally to signal propagation system's and more specifically to an improved fast signal low impedance propagation system.

The signal propagation, for example, in carries between stages or increments between stages of logic in counters, adders, etc, generally require that the propagation be as fast as possible while not adding substantial impedance to the line when a plurality of stages are included. For fast transmission, the prior art uses a transmission gate as illustrated in FIG. 1. The logic may be for example, an MOS device having its gate controlled by the propagation signal to immediately transmit or propagate the input signal which is a carry-in to the output terminal as a carry-out. A generate logic is provided in parallel to the transmission line to provide a carry-out as a function of the generate logic. Typical examples are U.S. Pat. No. 3,843,876 to Fette et. al. and U.S. Pat. No. 4,152,775 to Schwartz.

Another method of the prior art of propagation of information through stages of logic includes inverting logic, for example NAND or NOR gates at each stage. As illustrated in FIG. 2, the input signal is inverted and provided to inverting parallel propagation logic which provides an output signal to the signal out terminal. The inverting parallel propagation logic is similar to the generation logic in that it ties the output terminal to a specific value as a function of the carry-in and the propagation signal P. A typical example is shown in U.S. Pat. No. 4,054,788 to Maitland et. al. The use of inverting logic wherein the carry signal is inverted every stage is illustrated in U.S. Pat. No. 4,052,604 also to Maitland et. al.

Although the transmission gates provides a fast transition through each stage, the propagation through a long chain of logic stages tends to become slow because of the loss of signal level or increase of series impedance in the later stages. The inverting logic avoids the problems of impedance increase by recharging the logic levels at each stage but suffers from turnon delays of the inverting logic of each stage.

Thus there exists the need for a propagation logic which is capable of fast transmission without the build-up of impedance at the later stages of logic.

SUMMARY OF THE INVENTION

An object of the invention is to provide an improved propagation logic which provides fast transmission of the signal without increase of impedance level.

Another object of the present invention is to provide fast non-inverting serial transmission of a signal as a function of a propagation control followed by the reduction in the impedance of the logic stage.

These and other objects of the invention are obtained by using a serial non-inverting fast propagation logic between the signal-in and signal-out terminals in combination with double inverting logic parallel to the serial transmission logic to limit the impedance of the logic subsequent to the serial transmission to a single stage impedance. The serial fast propagation logic is generally a transmission switch connected between the input and output terminals and is controlled by the propagation signal provided from a propagation logic or a storage cell. The parallel impedance logic may include an input inverter connected to the input terminal providing an output to a first switch which ties the output terminal to a logic low in response to a logic low on the output terminal. A second switch responsive to a logic low propagation signal provides a logic high on the output terminal. The parallel impedance limiting circuit may also be responsive to the combination of the logic low on the input signal and a logic high propagation signal. Generation logic may also be connected to the output terminal and is responsive to a logic high generation signal to provide a logic low output. Also a logic high switch may be responsive to a logic low generate signal in combination with either a logic low propagate signal or a logic high input signal to provide a logic high output.

Other objects, advantages and novel features of the present invention will become apparent from the following detailed description of the invention among considered conjunction with the accompanying drawings.

DETAILED DESCRIPTION OF THE INVENTION

Figure 1:
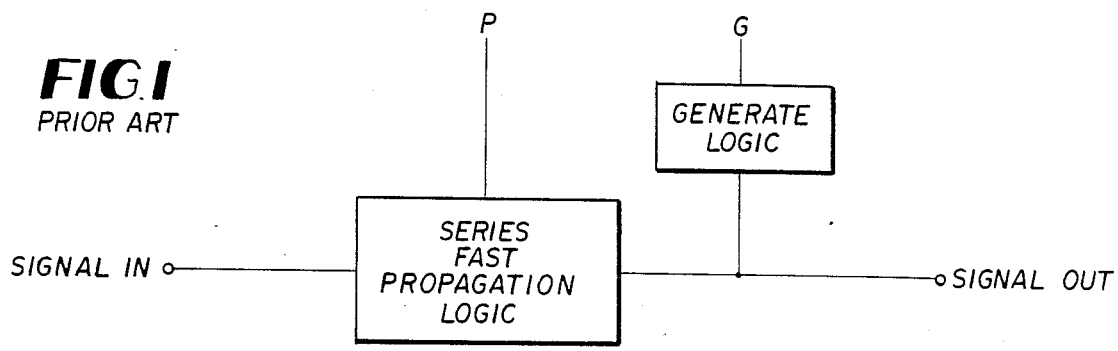
FIG. 1 is a block diagram of a serial propagation logic of the prior art.
Figure 2:
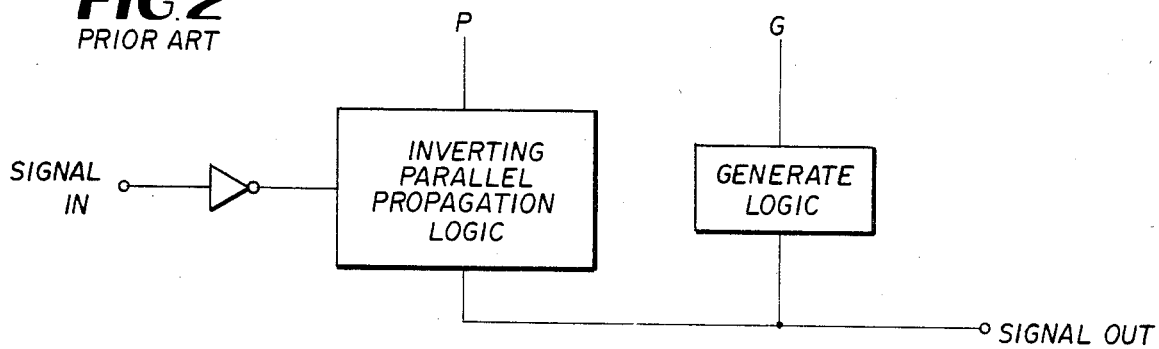
FIG. 2 is a block diagram of an inverting parallel propagation logic of the prior art.
Figure 3:
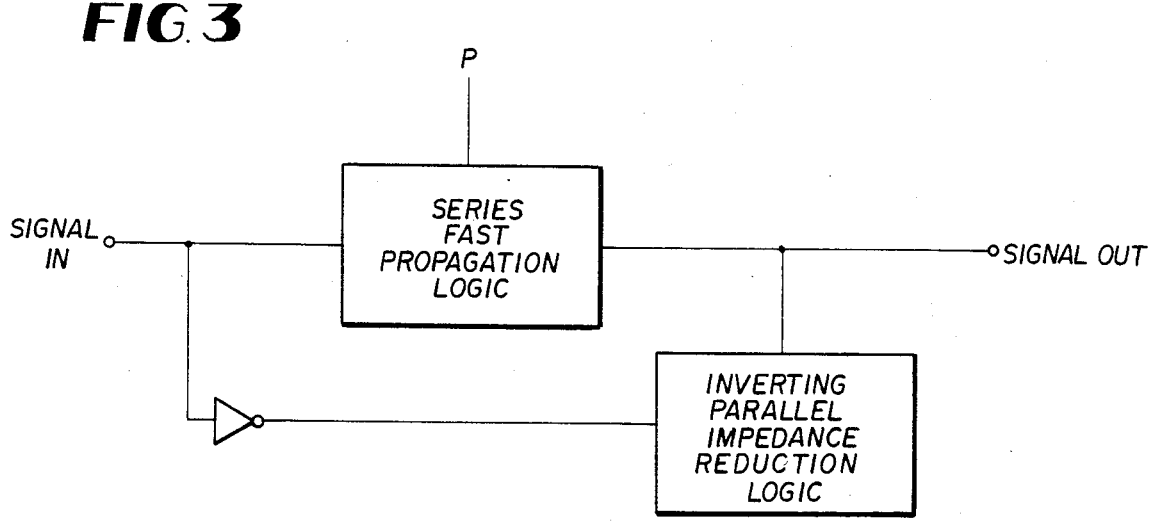
FIG. 3 is a block diagram of a propagation logic incorporating the principles of the present invention.

Propagation logic as illustrated in FIG. 3 has a signal input connected to the signal output terminal by a series propagation logic. Also connected between the signal input and signal output terminals are an inverter and an inverting parallel impedance reduction logic. The series fast propagation logic is responsive to a propagation signal P to immediately transmit the signal at the signal input terminal to the signal output terminal. Subsequent to the series fast propagation, the inverting parallel impedance reduction logic through double inversion maintains the output terminal at the logic high in response to a logic high input signal. By using the series fast propagtion logic, the input signal is immediately transmitted from the input to the output terminal as a function of the propagation signal P. The double inverting parallel impedance reduction logic provides an output signal distinct and independent of the input signal and reduces the line impedance to a single stage impedance of the double inversion. This reduces the overall impedance of the line and prevents the later stages from slowing down.

Figure 4:
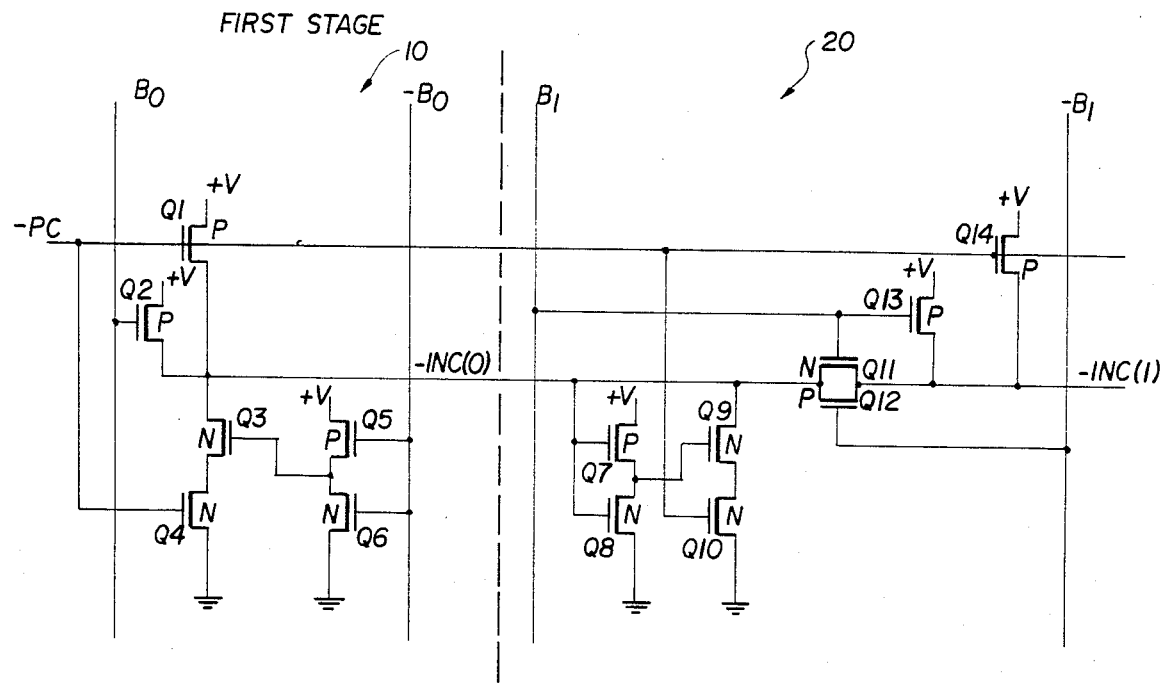
FIG. 4 is a schematic of the present invention used in a stage incrementing circuit.

An example of the specific propagation logic of the present invention used in a counter incrementer having a plurality of storage elements is illustrated in FIG. 4. The first stage 10 includes two bus lines $B_0$ and $-B_0$ which during precharge both have a high value and after precharge have opposite values depending upon the binary value of the bits stored. A precharged transistor Q1 having a precharged signal $-PC$ provided at its gates charges the increment line for that stage to a logic high value $+V$. A second transistor Q2 having its gate connectd to the $B_0$ line provides a logic high signal $+V$ to the increment line -Inc for a logic low value or zero on the line $B_0$. An inverter including transistors Q5 and Q6 have their input connected to the $-B_0$ line and their output connected to the gate of a transistor Q3. Connected to the source-drain path of transistor Q3 is a transistor Q4 having its gate connected to the precharge signal $-PC$. During the precharge, the transistor Q4 is off disabling transistor Q3 from effecting the increment line. In response to an increment signal, the values are loaded on to the buses B0 and $-B0$. If the value on B0 is one and on $-B0$ is zero, Q2 is held off by B0 whereas Q5 is turned on by $-B0$ turning on Q3 thereby pulling the increment line to a logic low. This provides an increment or carry output from stage 1. The inverter Q5, Q6 and the switch Q3 provide double stages of inversion.

A second stage 20 which is typical of all higher order stages is illustrated as including buses B1 and $-B1$. This stage includes the serial transmission logic as well as the parallel impedance reduction logic. The serial transmission logic includes parallel transmission gates Q11 and Q12. The gate of Q11 is connected to the bus B1 whereas the gate of Q12 is connected to $-B1$. For a one on B1 and a zero on $-B1$ both Q11 and Q12 are on providing a serial transmission of the input increment signal to the output. The parallel double inverting impedance reduction includes an inverter Q7, Q8 having its input connected to the input terminal and its output connected to the gate of transistor Q9. In series with the Q9 is the transistor Q10 having its gate connected to the precharge line $-PC$. As in the first stage, Q10 enables or disables the transistor Q9 to be responsive to the output of the inverter Q7 and Q8. Transistor Q13 having its gate connected to line B1 pulls up the output terminal to the logic high signal $+V$ when a zero is stored on line B1. A precharge transistor Q14 precharges the increment line to a logic high of $+V$ in response to the precharge signal $-PC$ being a logic low.

While the fast serial transmission transistors Q11 and Q12 provides fast transmission of the increment input signal as an increment output signal for the stage as a function of an enable signal or propagate signal from the lines B1 and $-B1$, the double inversion of inverter Q7, Q8 and switch Q9 ties the input of the serial transmission switch Q11 and Q12 to a logic low signal in response to a logic low on the input terminal. The switch Q9 reduces the impedance of the increment line to a single stage of impedance provided by transistors Q9 and Q10. As is well known, the increment signal is propagated to all subsequent stages until a stage is reached which has a zero on line B and 1 on line $-B$. This stage is incremented without propagation of the increment signal.

Figure 5:
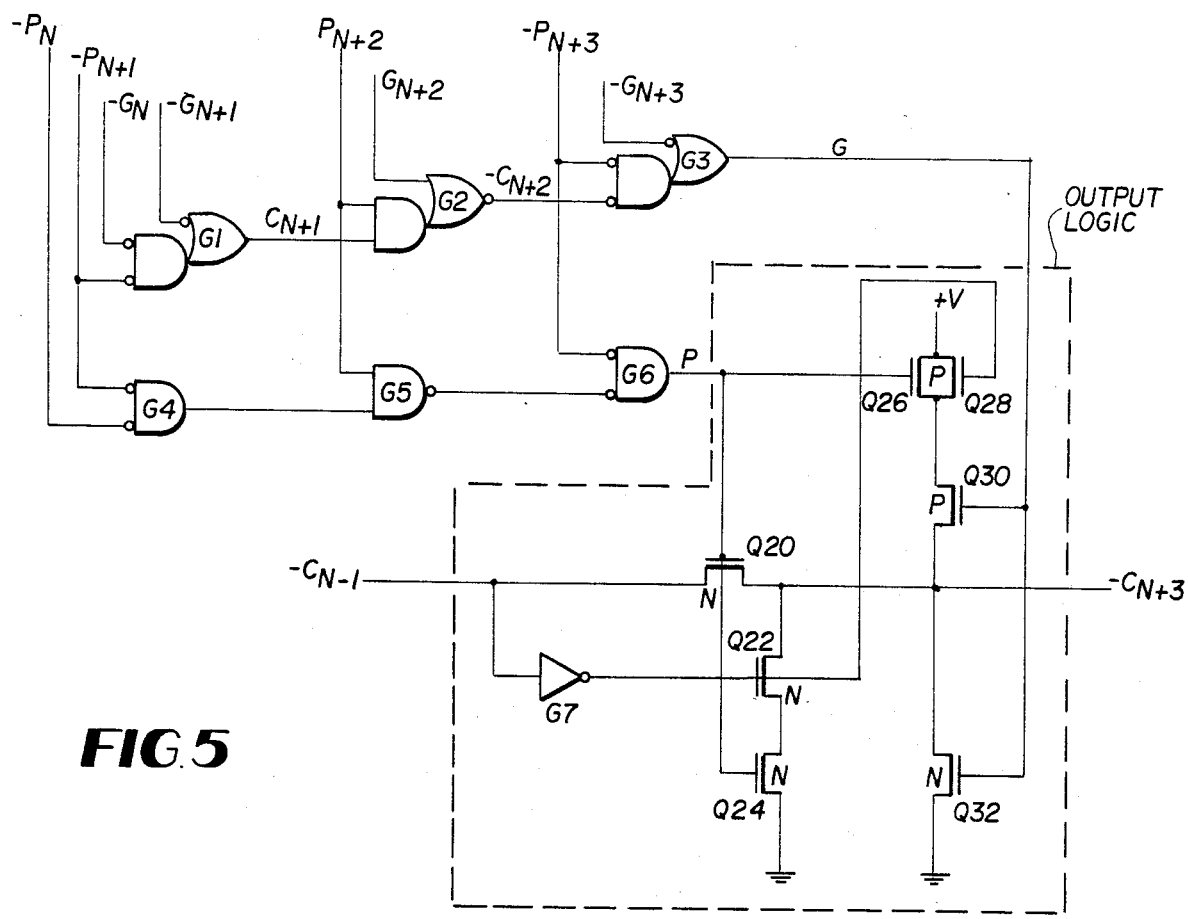
FIG. 5 is a schematic of the present invention used in a nibble fast carry look ahead logic.

The application of the present invention to carry look ahead scheme is illustrated in FIG. 5 for a nibble or four bits. The nth bit propagate input, $P_n$, is defined to be the exclusive OR of inputs $A_n$ and $B_n$. The nth bit generate input, $G_n$, is defined to be the AND of inputs $A_n$ and $B_n$. Where $A_n$ and $B_n$ are the two bits being added by the propagate and generate logic circuit not shown to produce $P_n$ and $G_n$. The carry look ahead for the nibble is based on the following two determinations:

(A) A nibble carry-in from the previous nibble is propagated through the present nibble to produce a nibble carry-out if all of the propagate signals of the four bits of the present nibble are high; and (B) The nibble carryout is provided if a carry is generated within the nibble and propagated by subsequent bit propagate signals P in the nibble.

For the first condition in FIG. 5, the nibble carry-out $-C_{n+3}$ is low if the carry-in $-C_{n-1}$ is low and all the propagate signals $P_n$ through $P_{n+3}$ are high. This propagate logic function is performed by cascaded NOR gate G4, NAND gate G5 and NOR gate G6 providing a propagate signal P to the output logic. The carry-in $-C_{n-1}$ is provided as the other propagate input of the output logic. NOR gate G4 receives the inputs $-P_n$ and $-P_{n+1}$, NAND gate G5 has inputs $P_{n+2}$ and the output of NOR gate G4, and NOR gate G6 has an input from $-P_{n+3}$ and from the output of NAND gate G5.

The second condition which will produce a nibble carry is if a carry is produced or generated within the nibble and it is propagated by the subsequent bit propagation signals. This second condition is provided as a generate input to the output logic by cascaded OR/NAND gate G1, AND/NOR gate G2 and OR/NAND gate G3. The input to the OR portion of gate G1 is the generate from the previous bit $-G_n$ and the propagate of that bit $-P_{n+1}$ and the input to the NAND portion is the generate $-G_{n+1}$ for that bit. The input to the AND section of gate G2 is the carry from the previous bit $C_{n+1}$ and the propagate for that bit $P_{n+2}$ and the input to the NOR section is from the generate $G_{n+2}$ for that bit. The input to the OR section of gate G3 is the carry signal $-C_{n+2}$ from the previous bit and the propagate signal $-P_{n+3}$ for that bit and the input to the NAND section is the generate $-G_{n+3}$ for that bit.

The output logic includes the serial transmission switch illustrated as transistor Q20 having its gate connected to the output P of the propagation portion of the nibble logic. An inverter G7 connected to the carry input $-C_{n-1}$ provides an input to the gate of switch Q22 which is connected to the nibble carry output terminal $-C_{n+3}$. A control switch Q24 connected in series with switch Q22 has its gate connected to the output terminal P of the propagate logic. As in FIGS. 3 and 4, the serial transmission transistor Q20 transmits the carry-in for the carry-out nibble and the transistor switch Q22 in combination with inverter G7 provide a double inversion and parallel impedance reduction to provide a logic low on the output terminal as a function of the input carry. It should be noted that the parallel output transistor Q22 is connected on the output terminal side of the serial transmission transistor Q20 in FIG. 5 versus the input side as illustrated by Q9 in FIG. 4. The transistor Q24 is connected to the propagate signal P which enables switch Q22 to be responsive to the carry-in signal. Thus the parallel switch in FIG. 5 is responsive to the carry-in signal and the propagate signal to provide an independent logic low output on the carry output terminal. In FIG. 4 the propagate signal is on the input side of the transmission gate. This transmission gate must remain activated to propagate the series reduction to ground to the output side of the transmission gate.

The output logic which pulls the output terminal to a logic high for a non propagate signal is illustrated as including transistors Q26, Q28 and Q30. The transistor Q30 has its gate connected to the generate signal G whereas the parallel transistors Q26 and Q28 which are in series with the transistor Q30 have their gates connected to the output of the propagate signal P and the inverter G7, respectively. Transistors Q26, Q28 and Q30 provide a logic high signal of $+V$ on the output terminal if the generate signal G is low and either the propagate signal P is low or the carry-in signal $-C_{n-1}$ is high. The output logic also includes transistor Q32 whose gate is connected to the generate output G of the propagate generate nibble logic to provide a logic low signal on the output terminal $-C_{n+3}$ for a logic high generate signal G.

For the preceding description of the preferred embodiments, it is evident that the objects of the inventions are obtained in that a fast propagate line is provided with reduced impedance. Although the invention has been described and illustrated in detail in two specific environments, it is evident that the general principles of FIG. 3 may be applied to other propagation or information transmission environments. It is to be clearly understood that the same is by way of illustration and example only and is not to be taken by way of limitation. The spirit and scope of this invention are to be limited only to the terms of the appended claims.

What is claimed is:

1. A propagation circuit comprising:
   an input signal terminal;
   an output signal terminal;
   a propagate input terminal;
   a transmission means connected in series between said input signal and output signal terminals for transmitting an input signal at said input signal terminal to said output signal terminal without delay in response to a propagate signal on said propagate input terminal; and
   limiting means connected to said input signal terminal for limiting the series impedance of said propagation circuit subsequent to transmission by said transmission means in response to a low input signal at said input signal terminal.

2. A circuit according to claim 1 including logic high means connected to said output signal terminal for producing a logic high signal at said output signal terminal in response to a logic low propagate signal at said propagate input terminal.

3. A circuit according to claim 2 wherein said limiting means includes logic low means connected to said input signal terminal for maintaining a logic low signal distinct from said input signal at said output signal terminal in response to a logic low signal at said input signal terminal.

4. A circuit according to claim 1 wherein said limiting means includes logic low means connected to said input signal terminal for maintaining a logic low signal distinct from said input signal at said output signal terminal in response to a logic low signal at said input signal terminal.

5. A circuit according to claim 4 wherein said logic low means includes an inverter means having an input connected to said input signal terminal and an output and a latch means having an input connected to said output of said inverter means for latching said input signal terminal to a logic low in response to a logic low at said input signal terminal.

6. A circuit according to claim 1 wherein said limiting means includes an inverter means having an input connected to said input signal terminal and an output and a latch means having an input connected to said output of said inverter means for latching said input signal terminal to a logic low in response to a logic low at said input signal terminal.

7. A carry circuit comprising:
   a carry-in input terminal;
   a carry-out output terminal;
   a propagate input terminal.
   a generate input terminal;
   a generate means connected to said carry-out output terminal for producing a logic low on said carry-out output terminal in response to a generate signal at said generate input terminal;
   a transmission means connected in series between said carry-in and said carry-out terminals for transmitting a carry-in signal at said carry-in input terminal to said carry-out terminal without delay in response to a propagate signal on said propagate input terminal; and
   limiting means connected to said carry-in terminal for limiting the series impedance of said carry circuit subsequent to tranmission by said transmission means in response to a low carry-in signal at said carry-in terminal.

8. A carry circuit according to claim 7 including logic high means connected to said carry-out terminal for producing a logic high signal at said carry-out terminal in response to a low propagate signal and a low generate signal at said propagate and generate input terminals respectively.

9. A carry circuit according to claim 8 wherein said limiting means includes logic low means connected to said carry-in terminal for maintaining a logic low signal distinct from said carry-in signal at said carry-out terminal in response to a logic low signal at said carry-in terminal.

10. A carry circuit according to claim 7 including a logic high means connected to said carry-out terminal for producing a logic high signal at said carry-out terminal in response to a logic low generate signal and either a logic low propagate or a logic high carry-in signal at said generate, propagate and carry-in terminals respectively.

11. A carry circuit according to claim 7 wherein said limiting means includes logic low means connected to said carry-in terminal for maintaining a logic low signal distinct from said carry-in signal at said carry-out terminal in response to a logic low signal at said carry-in terminal.

12. A carry circuit according to claim 11 wherein said logic low means is responsive to a logic low carry-in signal and logic high propagate signal at said carry-in and propagate input terminals respectively to maintain a logic low at said carry-out terminal.

13. A carry circuit according to claim 12 including a logic high means connected to said carry-out terminal for producing a logic high signal at said carry-out terminal in response to a logic low generate signal and either a logic low propagate or logic high carry-in signal at said generate, propagate and carryin terminals respectively.

14. A carry circuit according to claim 7 wherein said limiting means includes an inverter means having an input connected to said carry-in terminal and an output and a latch means having an input connected to said output of said inverter means for latching said carry-out terminal to a logic low in response to a logic low at said carry-in input terminal.

15. A carry circuit according to claim 7 including a logic low means connected to said carry-out terminal for producing a logic low signal at said output terminal in response to a logic high generate signal at said generate input terminal.

* * * * *